United States Patent
Yu et al.

(10) Patent No.: US 12,197,791 B2
(45) Date of Patent: Jan. 14, 2025

(54) METHOD, BRIDGING DEVICE, SYSTEM AND MEDIUM OF VIRTUALIZATION PROCESSING OF STORAGE DEVICE

(71) Applicant: Beijing Volcano Engine Technology Co., Ltd., Beijing (CN)

(72) Inventors: Haixin Yu, Beijing (CN); Haozhong Zhang, Beijing (CN); Shoujing Bo, Beijing (CN); Jiali Jiang, Beijing (CN); Xuechao Wei, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/749,424

(22) Filed: Jun. 20, 2024

(65) Prior Publication Data

US 2024/0419367 A1   Dec. 19, 2024

(30) Foreign Application Priority Data

Jun. 19, 2023   (CN) .......................... 202310730053.8

(51) Int. Cl.
   *G06F 3/06*   (2006.01)
(52) U.S. Cl.
   CPC .......... *G06F 3/0665* (2013.01); *G06F 3/0604* (2013.01); *G06F 3/0659* (2013.01); *G06F 3/0683* (2013.01)
(58) Field of Classification Search
   CPC .... G06F 3/0665; G06F 3/0604; G06F 3/0659; G06F 3/0683; G06F 9/45558; G06F 9/5077; G06F 9/45533
   See application file for complete search history.

(56) References Cited

U.S. PATENT DOCUMENTS

| | | | |
|---|---|---|---|
| 2017/0329625 A1* | 11/2017 | Li | ........................ G06F 12/109 |
| 2018/0181425 A1* | 6/2018 | Kim | .................... G06F 9/45558 |
| 2018/0321879 A1 | 11/2018 | Lu | |
| 2020/0341858 A1 | 10/2020 | Chopra et al. | |
| 2020/0371828 A1 | 11/2020 | Chiou et al. | |
| 2024/0256441 A1* | 8/2024 | Hyatt | .................. G06F 12/1036 |

OTHER PUBLICATIONS

Extended European Search Report for European Patent Application No. 24182939.9, mailed on Nov. 18, 2024, 12 pages.

\* cited by examiner

*Primary Examiner* — Khoa D Doan
*Assistant Examiner* — Tong B. Vo
(74) *Attorney, Agent, or Firm* — Astute IP Law Group

(57) ABSTRACT

Embodiments of the present application relate to a method, a bridging device, a system and a medium of virtualization processing of a storage device. The method comprises: receiving an initial access request to a virtual disk sent by a virtual machine user; translating the virtual address corresponding to the virtual machine to a first physical address corresponding to a host based on a preconfigured address mapping relationship; translating the virtual access address to a second physical address corresponding to the storage device based on a preconfigured virtual partition mapping relationship; and generating a target access request based on the first physical address and the second physical address, and sending the target access request to the host, so as to cause the host to perform information interaction with the storage device based on the target access request.

20 Claims, 4 Drawing Sheets

METHOD, BRIDGING DEVICE, SYSTEM AND MEDIUM OF VIRTUALIZATION PROCESSING OF STORAGE DEVICE

CROSS-REFERENCE TO RELATED APPLICATION(S)

This application claims priority to Chinese Application No. 202310730053.8 filed on Jun. 19, 2023, the disclosure of which is incorporated herein by reference in its entity.

FIELD

The present application relates to the field of computer technology, and in particular, to a method, a bridging device, a system and a medium of virtualization processing of a storage device.

BACKGROUND

With the development of computer technology, the deployment of virtual machines on a host has been widely used due to the advantages of cost savings, time savings, flexibility and so on. The virtual machine (VM) refers to a complete hardware system simulated by software with full hardware system functionality and running in a completely isolated environment, the host is the physical basis of the virtual machine, and the virtual machine resides in the host computer.

Currently, in order to satisfy the storage space requirements of virtual machine users, each virtual machine is usually configured with a physical disk. However, the actual storage space used by virtual machine users may be less than the storage space of the physical disk, resulting in a waste of resources.

SUMMARY

To solve or at least partly solve the above technical problems, the embodiments of the present disclosure provide a method, a bridging device, a system and a medium of virtualization processing of a storage device.

In a first aspect, the embodiments of the present disclosure provide a method of virtualization processing of a storage device, comprising:
  receiving an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device;
  translating a virtual address corresponding to the virtual machine to a first physical address corresponding to a host based on a preconfigured address mapping relationship;
  translating the virtual access address to a second physical address corresponding to the storage device based on a preconfigured virtual partition mapping relationship; and
  generating a target access request based on the first physical address and the second physical address, and sending the target access request to the host, so as to cause the host to perform information interaction with the storage device based on the target access request.

In a second aspect, the embodiments of the present disclosure provide a method of virtualization processing of a storage device, comprising:
  sending, to a bridging device, an initial access request of a virtual machine user to a virtual disk, wherein the initial access request comprises: a virtual address corresponding to the virtual machine, and a virtual access address in the virtual disk, wherein the virtual disk is a virtual storage area allocated for the virtual machine user by the bridging device after virtualization partitioning of a physical disk in the storage device;
  receiving a target access request sent by the bridging device, the target access request comprising a first physical address and a second physical address, wherein the first physical address is an address corresponding to a host as translated from a virtual address corresponding to the virtual machine by the bridging device based on a preconfigured address mapping relationship, and the second physical address is an address corresponding to the storage device as translated from the virtual access address by the bridging device based on a preconfigured virtual partition mapping relationship; and
  performing information interaction with the storage device based on the target access request.

In a third aspect, the embodiments of the present disclosure further provide a bridging device, comprising:
  a processor; and
  a memory for storing instructions executable by the processor;
  the processor being for reading the executable instructions from the memory and executing the instructions to implement a method of virtualization processing of a storage device as described in the first aspect.

In a fourth aspect, the embodiments of the present disclosure further provide a system of virtualization processing of a storage device, comprising:
  a bridging device as described in the third aspect, a host and a storage device, wherein the bridging device is connected with the host, at least one virtual machine is deployed on the host, and the virtual machine user performs information interaction with the host-mounted storage device through the bridging device.

The embodiments of the present disclosure further provide a computer readable storage medium storing a computer program thereon, wherein the computer program is for performing a method of virtualization processing of a storage device as described in the first aspect or the second aspect.

Compared with the prior art, the technical solution provided by the embodiments of the present disclosure boast the following advantages: the embodiments of the present disclosure can receive an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device; translate a virtual address corresponding to the virtual machine to a first physical address corresponding to a host based on a preconfigured address mapping relationship; translate the virtual access address to a second physical address corresponding to the storage device based on a preconfigured virtual partition mapping relationship; and generate a target access request based on the first physical address and the second physical address, and sending the target access request to the host, so as to cause the host to perform information interaction with the storage device based on the target access request. By implementing the foregoing technical solution, in the event that at least one virtual machine is deployed on the host and the physical disk in the storage device is virtualized-partitioned to virtual disks, the initial access request to the virtual disk sent by the virtual machine user can be converted to a target access request, so as to cause the host to perform information interaction with the storage device based on the target access request. Compared with the prior art, the technical solution disclosed herein can realize the sharing of the physical disk among a plurality of virtual machine users and thus improves the waste of resources.

BRIEF DESCRIPTION OF THE DRAWINGS

Through the following specific implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale.

DETAILED DESCRIPTION OF EMBODIMENTS

The embodiments of the present application will be described with reference to the accompanying drawings, in which some embodiments of the present application have been illustrated. However, it should be understood that the present disclosure can be implemented in various manners, and thus should not be construed to be limited to embodiments disclosed herein. On the contrary, those embodiments are provided for the thorough and complete understanding of the present application. It should be understood that the drawings and embodiments of the present application are only used for illustration, rather than limiting the protection scope of the present application.

It should be understood that various steps described in method implementations of the present application may be performed in a different order and/or in parallel. In addition, the method implementations may comprise an additional step and/or omit a step which is shown. The scope of the present application is not limited in this regard.

The term "comprise" and its variants used herein are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present application are only for differentiating different apparatuses, modules or units rather than limiting the order or mutual dependency of functions performed by these apparatuses, modules or units.

Note that the modifications "one" and "a plurality" mentioned in the present application are illustrative rather than limiting, and those skilled in the art should understand that unless otherwise specified, they should be understood as "one or more."

Names of messages or information interacted between a plurality of apparatuses in the implementations of the present application are merely for the illustration purpose, rather than limiting the scope of these messages or information.

To solve the above problems, the embodiments of the present disclosure provide a method of virtualization processing of a storage device, which will be described in conjunction with specific embodiments.

Figure 1:
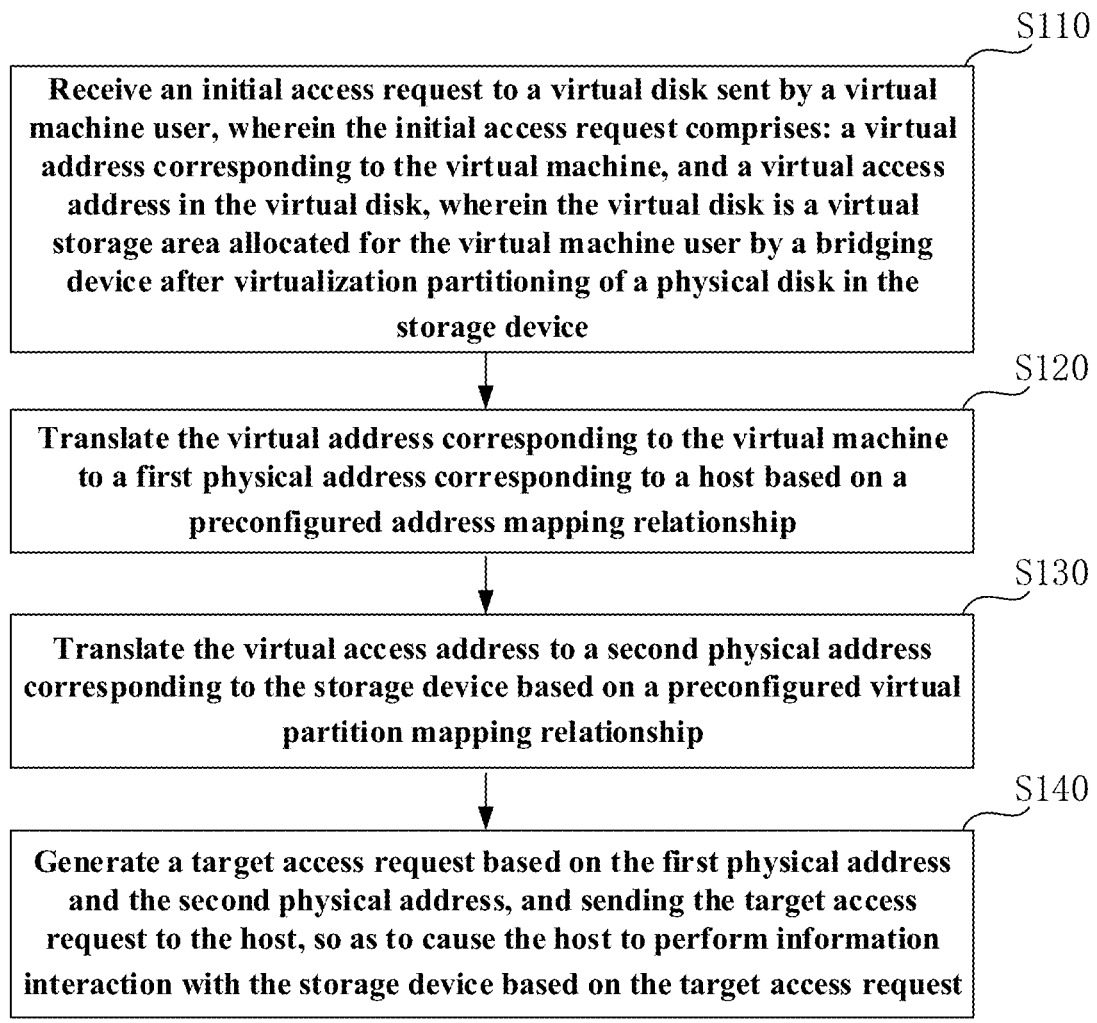
FIG. 1 shows a schematic flowchart of a method of virtualization processing of a storage device provided by the embodiments of the present disclosure.
Figure 2:
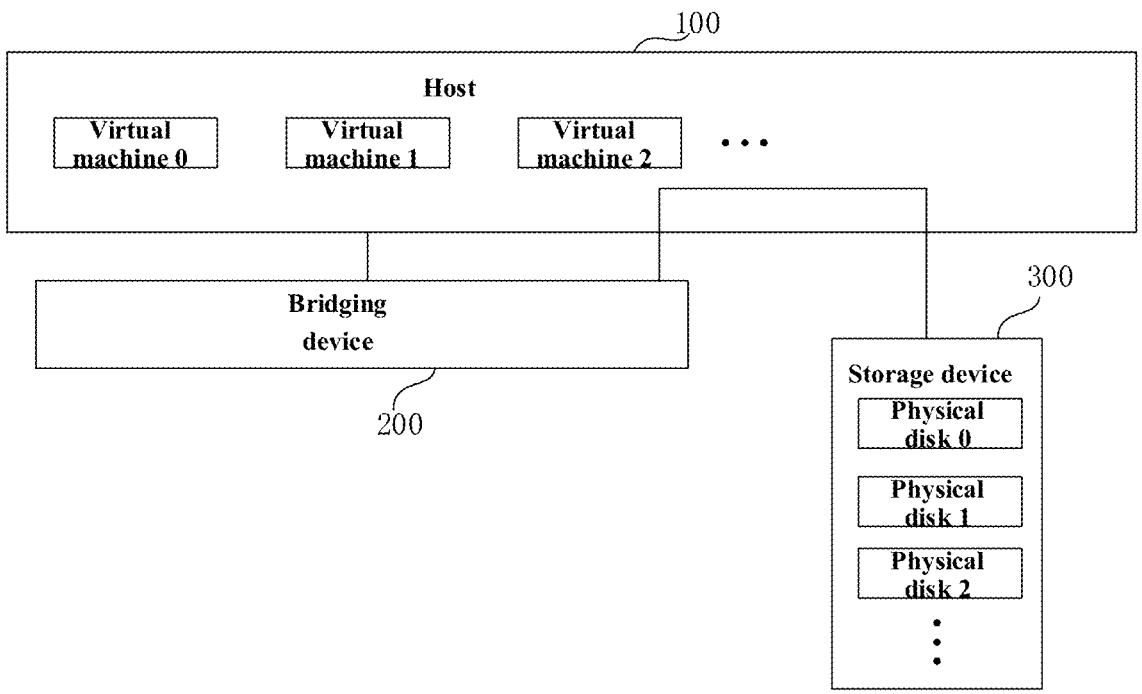
FIG. 2 shows a schematic diagram of a system of virtualization processing of a storage device provided by the embodiments of the present disclosure.

FIG. 1 is a schematic flowchart of a method of virtualization processing of a storage device provided by the embodiments of the present disclosure. The method may be performed by a bridging device. As shown in FIG. 2, a bridging device 200 is connected with a host 100, e.g., the bridging device 200 is connected with the host via a serial interface, such as a High Speed Serial Computer Extension Bus Standard (Peripheral Component Interconnect Express (PCIE) interface or other interface known to those skilled in the art. At least one virtual machine is deployed on the host. A virtual machine user performs information interaction with a storage device 300 mounted on the host 100 through the bridging device 200. A physical disk in the storage device 300 may be connected with the host via a serial interface, such as a PCIE interface or other interface known to those skilled in the art. As shown in FIG. 1, the method comprises:

S110, receiving an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device.

Specifically, the initial access request may include, without limitation to, a read operation, a write operation, etc.

Specifically, the virtual access address is a logical address used by the virtual machine user to access the physical disk in the storage device, i.e., an address used by the virtual machine user to access the virtual disk. For example, the virtual access address is for indicating where in the virtual disk interaction information is to be read from or written to.

Specifically, the virtual address is a logical address used by the virtual machine user to access the memory of the host, i.e., an address used by the virtual machine user to access a virtual memory, wherein the virtual memory is a virtual storage area (i.e., the virtual storage area after virtualization partitioning of the memory of the host) for which the virtual machine user applies to the host. For example, the virtual address is for indicating where in the virtual memory the interaction information is to be cached in.

S120, translating a virtual address corresponding to the virtual machine to a first physical address corresponding to a host based on a preconfigured address mapping relationship.

Specifically, the address mapping relationship is a one-to-one correspondence relationship between an address in the virtual memory and a physical address in the memory of the host.

Specifically, the first physical address is a physical address used by the virtual machine user to access the memory of the host. For example, the first physical address is for indicating where in the memory of the host the interaction information is to be cached in.

S130, translating the virtual access address to a second physical address corresponding to the storage device based on a preconfigured virtual partition mapping relationship.

Specifically, the virtual partition mapping relationship is a one-to-one correspondence relationship between an address in the virtual disk and a physical address in the physical disk in the storage device.

Specifically, the second physical address is a physical address used by the virtual machine user to access the physical disk in the storage device. For example, the second physical address is for indicating where in which physical disk in the storage device the interaction information is to be read from or written to.

S140, generating a target access request based on the first physical address and the second physical address, and sending the target access request to the host, so as to cause the host to perform information interaction with the storage device based on the target access request.

Specifically, there may be a variety of specific implementations of generating the target access request, which is not limited here. For example, the target access request is generated by replacing the virtual address in the initial access request with the first physical address and replacing the virtual access address with the second physical address.

The method of virtualization processing of a storage device provided by the embodiments of the present disclosure will be illustrated in detail in combination with two specific examples.

In one example, receiving an initial read operation to a virtual disk sent by a virtual machine user, wherein the initial read operation comprises: a virtual address corresponding to the virtual machine, and a virtual access address in the virtual disk; a virtual address corresponding to the virtual machine is translated to a first physical address corresponding to a host based on a preconfigured address mapping relationship; the virtual access address is translated to a second physical address corresponding to a storage device based on a preconfigured virtual partition mapping relationship; and a target read operation is generated based on the first physical address and the second physical address, and the target read operation is sent to the host, so as to cause the host to read corresponding first target data (i.e., interaction information) from the storage device based on the second physical address, store the first target data to a memory of the host based on the first physical address and send the first target data to the virtual machine user based on a preset address routing table.

In the other example, receiving an initial write operation to a virtual disk sent by a virtual machine user, wherein the initial write operation comprises: a virtual address corresponding to the virtual machine, and a virtual access address in the virtual disk; a virtual address corresponding to the virtual machine is translated to a first physical address corresponding to a host based on a preconfigured address mapping relationship; the virtual access address is translated to a second physical address corresponding to a storage device based on a preconfigured virtual partition mapping relationship; and a target write operation is generated based on the first physical address and the second physical address, so as to cause the host to read corresponding second target data (i.e., interaction information) from a memory of the host based on the first physical address and write the second target data to the storage device based on the second physical address.

It may be understood that according to the embodiments of the present disclosure, the sharing of the physical disk among a plurality of virtual machine users can be realized, thereby improving the waste of resources; moreover, since the conversion of the initial access request to the target access request is performed by the bridging device rather than the host, host resources are not consumed, which helps to increase the effective utilization rate of host resources, i.e., helps to increase the occupation rate of virtual machines on host resources.

In the embodiments of the present disclosure, in the event that at least one virtual machine is deployed on the host and the physical disk in the storage device is virtualized-partitioned to virtual disks, the initial access request to the virtual disk sent by the virtual machine user can be converted to a target access request, so as to cause the host to perform information interaction with the storage device based on the target access request. Compared with the prior art, the technical solution disclosed herein can realize the sharing of the physical disk among a plurality of virtual machine users and thus improves the problem of the waste of resources.

Figure 3:
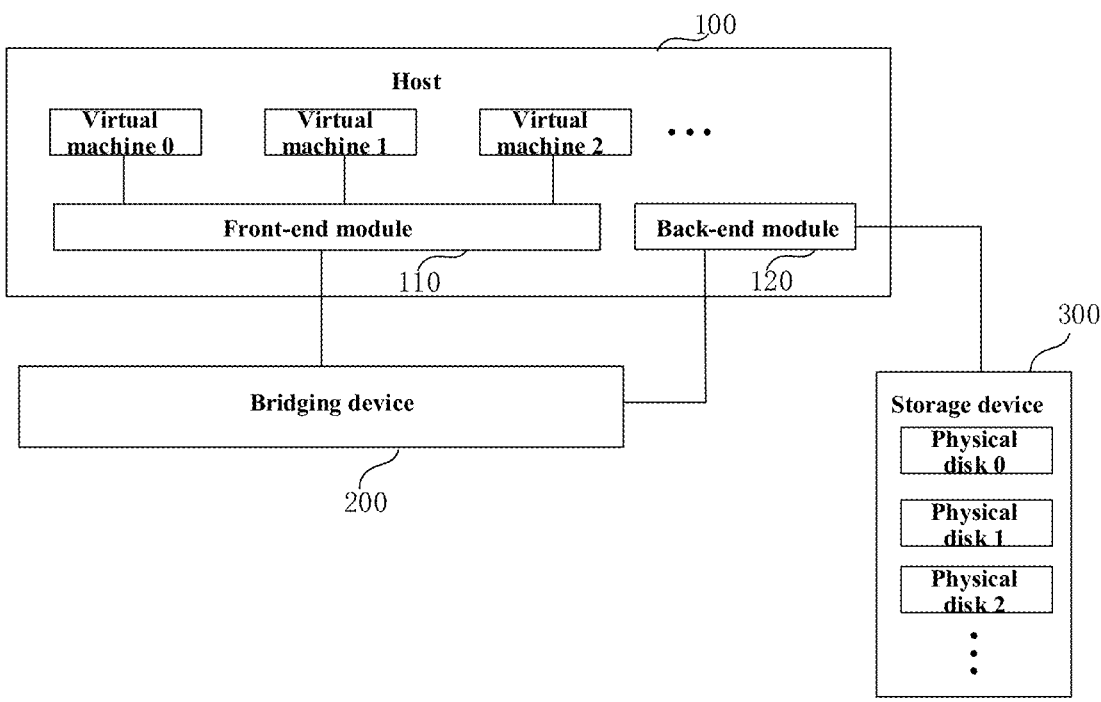
FIG. 3 shows a schematic diagram of another system of virtualization processing of a storage device provided by the embodiments of the present disclosure.

In another implementation of the present disclosure, with reference to FIG. 3, the host 100 comprises a front-end module 110 and a back-end module 120, wherein the front-end module 110 is connected with the virtual machine, the back-end module 120 is connected with the storage device 300, the bridging device 200 is connected with the front-end module 110 and the back-end module 120 respectively.

In some embodiments, a process of configuring the address mapping relationship comprises: receiving configuration information issued by the virtual machine through the front-end module; applying for a memory space of the host to the back-end module based on the configuration information; and creating the address mapping relationship based on the configuration information and the memory space.

Specifically, the configuration information is information that guides the bridging device to apply for the memory space of the host. For example, the configuration information may include, without limitation to, the size of virtual memory allocated for the virtual machine user, or a virtual start address and virtual end address of the virtual memory, etc.

Specifically, virtual addresses in the virtual memory may correspond to physical addresses in the requested memory space of the host one to one, so as to create the address mapping relationship.

It may be understood that by causing the bridging device to apply for the memory space of the host to the back-end module based on the configuration information and create the address mapping relationship based on the configuration information and the memory space, the virtual machine user can flexibly adjust the size of the requested memory space of the host by adjusting the configuration information, so as to meet requirements on the memory space. Moreover, the address mapping relationship can be created simply and conveniently, which helps to reduce the difficulty of creating the address mapping relationship. In addition, since the creation of the address mapping relationship is performed by the bridging device rather than the host, host resources are not consumed, which helps to increase the effective utilization rate of host resources.

In other embodiments, a process of configuring the virtual partition mapping relationship comprises: obtaining physical disk information on the storage device through the back-end module; receiving virtual disk configuration information issued by the virtual machine through the front-end module; performing virtualization partitioning on the storage device based on the physical disk information; and configuring a corresponding virtual disk for the virtual machine user based on the virtual disk configuration information, and creating the virtual partition mapping relationship.

Specifically, the physical disk information is information related to the physical disk in the storage device, which serves as a basis for virtualization partitioning of the storage device. For example, the physical disk information may include, without limitation to, the total number of physical disks, the size of each physical disk, the size of space remaining on each physical disk (i.e., the size of free space that is not allocated to the virtual machine user), and a disk identifier of each physical disk.

Specifically, the total number of virtual disks obtained after virtualization partitioning of the storage device and the size of each virtual disk may be set by those skilled in the art according to actual situations, which is not limited herein.

Specifically, the virtual disk configuration information is information that guides the bridge device to matching the virtual disk to the virtual machine user. The virtual disk configuration information may include, without limitation to, the size of the desired virtual disk, or a virtual start address and virtual end address of the desired virtual disk.

Specifically, a virtual disk that matches the virtual disk configuration information is selected from virtual disks obtained from the virtualization partitioning, and an address in the matched virtual disk corresponds to the physical address in the storage device one to one, so as to create the virtual partition mapping relationship.

In one example, selecting a virtual disk that matches the virtual disk configuration information from virtual disks obtained from the virtualization partitioning may comprise: selecting a virtual disk having a minimum size difference with the size of a desired virtual disk from unoccupied virtual disks (i.e., virtual disks that are not configured for virtual machine users) obtained after virtualization partitioning; or selecting candidate virtual disks with the size equal to the size of a desired virtual disk from unoccupied virtual disks obtained after virtualization partitioning, and randomly selecting one of the candidate virtual disks as the virtual disk that matches the virtual disk configuration information.

It may be understood that by causing the bridging device to configure a corresponding virtual disk for the virtual machine user based on the virtual disk configuration information and create the virtual partition mapping relationship, and the virtual machine user can flexibly adjust the size of the desired virtual disk by adjusting the virtual disk configuration information, and the virtual partition mapping relationship can be created in a simple and convenient way, which helps to reduce the difficulty of creating the virtual partition mapping relationship. Moreover, the virtual disks corresponding to a plurality of virtual machine users are isolated and decoupled from each other, which is conducive to the realization of dynamic disk mounting and dismounting for each virtual machine user. In addition, since both the virtualization partitioning of the storage device and the creation of the virtual partition mapping relationship are performed by the bridging device rather than the host, host resources are not consumed, which is conductive to increasing the effective utilization rate of host resources.

In some examples, the process of configuring the virtual partition mapping relationship may further comprise: obtaining physical disk information on the storage device through the back-end module; receiving virtual disk configuration information issued by the virtual machine through the front-end module; performing virtualization partitioning on the storage device based on the physical disk information; and configuring a corresponding virtual disk for the virtual machine user based on the virtual disk configuration information, and creating the virtual partition mapping relationship. As such, the virtual disk with the size exactly equal to the desired size can be flexibly configured for the virtual machine user, so that the size of the virtual disk configured for the virtual machine user is the same as the size of the desired virtual disk and the waste of resources can be avoided.

In a further implementation of the present disclosure, receiving an initial access request to a virtual disk sent by the virtual machine user comprises: receiving a doorbell message issued by the front-end module; and obtaining an initial access request to a virtual disk sent by the virtual machine user from a front-end read and write request queue of the front-end module based on the doorbell message.

Specifically, the front-end read and write request queue is a queue in the front-end module for storing read operations and write operations.

Specifically, the doorbell message is for notifying the bridging device to obtain the initial access request from the front-end read and write request queue. The doorbell message may include, without limitation to, a storage location or sequence number of the initial access request, etc.

It may be understood that by causing the bridging device to obtain the initial access request to the virtual disk sent by the virtual machine user from the front-end read and write request queue of the front-end module based on the doorbell message, the bridging device can obtain the initial access request in time, further the efficiency of information interaction between the virtual machine and the storage device can be improved, and the bridging device does not need to allocate additional computing resources to detect in real time whether there is an initial access request in the front-end read and write request queue, which is conducive to reducing the performance requirements on the bridging device.

In some examples, the bridging device may also poll to detect the front-end read and write request queue according to first preset periods, so as to obtain the initial access request from the front-end read and write request queue of the front-end module.

In a yet further implementation of the present disclosure, sending the target access request to the host comprises: sending the target access request to a back-end read and write request queue of the back-end module; and sending a notification message to the back-end module to cause the back-end module to obtain the target access request from the back-end read and write request queue based on the notification message.

Specifically, the back-end read and write request queue is a queue in the back-end module for storing read operations and write operations.

Specifically, the notification message is for notifying the back-end module to obtain the target access request from the back-end read and write request queue. The notification message may include, without limitation to, a storage location or sequence number of the target access request, etc.

It may be understood that by arranging the bridging device to send the notification message to the back-end module to cause the back-end module to obtain the target access request from the back-end read and write request queue based on the notification message, the back-end module can obtain the target access request in time, further the efficiency of information interaction between the virtual machine and the storage device can be improved, and the back-end module does not need to allocate additional computing resources to detect in real time whether there is a target access request in the back-end read and write request queue, which is conducive to reducing the performance requirements on the host.

In another yet further implementation of the present disclosure, the method further comprises: polling to detect a back-end read and write completion queue of the back-end module according to preset periods; and in the event of obtaining a completion message corresponding to the target access request from the back-end read and write completion queue, sending the completion message to a front-end read and write completion queue of the front-end module, wherein a completion message in the front-end read and write completion queue corresponds to the initial access request, so as to cause the virtual machine user to perform a related operation based on the completion message.

Specifically, the back-end read and write completion queue is a queue in the back-end module for storing completion messages.

Specifically, the front-end read and write completion queue is a queue in the front-end module for storing completion messages.

Specifically, the completion message is for characterizing that the host has completed information interaction with the storage device based on the target access request. The completion message may include, without limitation to, its storage location in the front-end read and write completion queue, a sequence number of a corresponding initial access request, etc.

Specifically, a value of the preset period may be set by those skilled in the art according to specific situations, which is not limited herein.

Specifically, when the initial access request is a read operation, the virtual machine user reads information, which is read from the virtual access address, from the virtual memory based on the completion message (i.e., reading information read from the second physical address from the memory of the host); when the initial access request is a write operation, the virtual machine user determines based on the completion message that the information has been written to the virtual disk (i.e., the storage device).

It may be understood that by causing the bridging device to poll to detect the back-end read and write completion queue according to preset periods, the completion message corresponding to the target access request can be obtained in time, and further the efficiency of information interaction between the virtual machine and the storage device can be increased.

Figure 4:
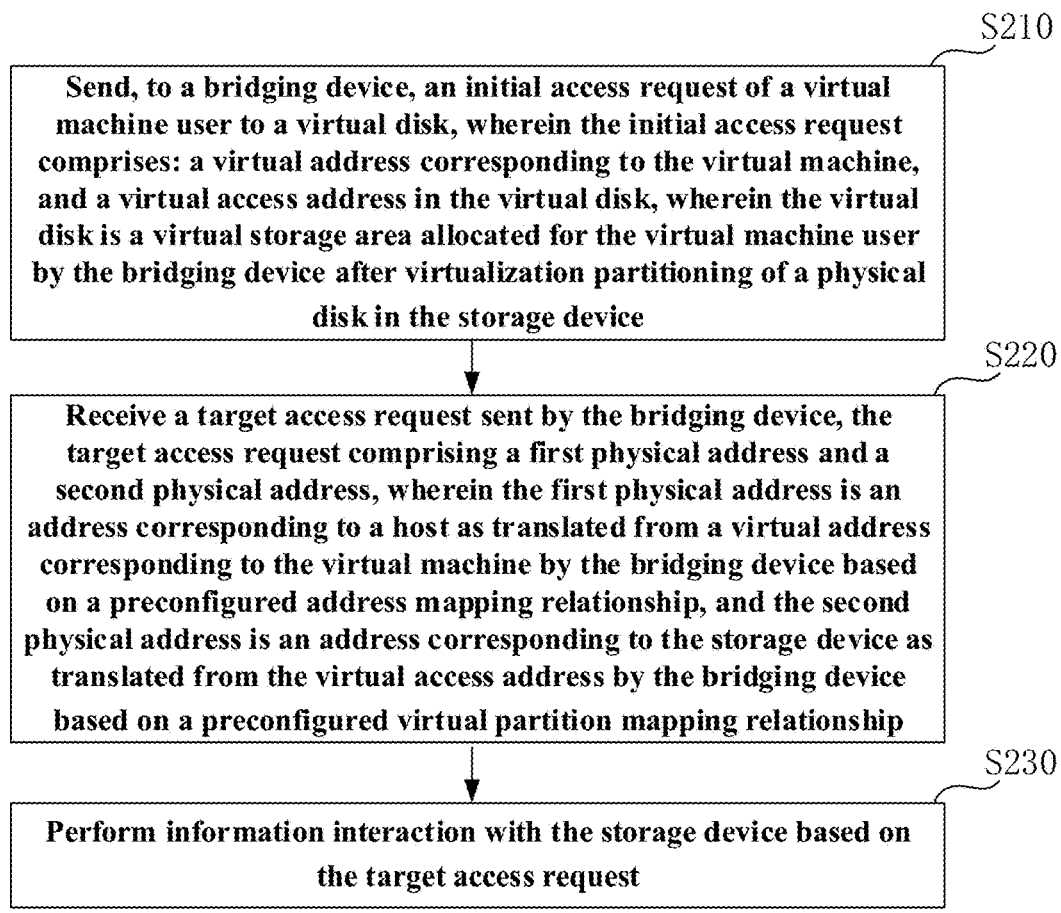
FIG. 4 shows a schematic flowchart of a method of virtualization processing of a storage device provided by the embodiments of the present disclosure.

FIG. 4 is a schematic flowchart of a method of virtualization processing of a storage device provided by the embodiments of the present disclosure. The method may be performed by a host. As shown in FIG. 2, the host is connected with the bridging device, at least one virtual machine is deployed on the host, and the virtual machine user performs information interaction with the host-mounted storage device through the bridging device. As shown in FIG. 4, the method comprises:

S210, sending, to a bridging device, an initial access request of a virtual machine user to a virtual disk, wherein the initial access request comprises: a virtual address corresponding to the virtual machine, and a virtual access address in the virtual disk, wherein the virtual disk is a virtual storage area allocated for the virtual machine user by the bridging device after virtualization partitioning of a physical disk in the storage device.

Specifically, the understanding about the virtual address and the virtual access address may be referred to the above description and thus is not detailed herein.

Optionally, still with reference to FIG. 3, the host 100 comprises a front-end module 110 and a back-end module 120, wherein the front-end module 110 is connected with the virtual machine, the back-end module 120 is connected with the storage device 300, the bridging device 200 is connected with the front-end module 110 and the back-end module 120 respectively. Sending, to a bridging device, an initial access request of a virtual machine user to a virtual disk may comprise: the virtual machine user sending the initial access request to the virtual disk to a front-end read and write request queue of the front-end module; the front-end module issuing a doorbell message to the bridging device to cause the bridging device to obtain the initial access request to the virtual disk sent by the virtual machine user from the front-end read and write request queue of the front-end module based on the doorbell message.

S220, receiving a target access request sent by the bridging device, and the target access request comprises a first physical address and a second physical address, and wherein the first physical address is an address corresponding to a host as translated from a virtual address corresponding to the virtual machine by the bridging device based on a preconfigured address mapping relationship, and the second physical address is an address corresponding to the storage device as translated from the virtual access address by the bridging device based on a preconfigured virtual partition mapping relationship.

Specifically, the understanding about the first physical address, the address mapping relationship, the second physical address and the virtual partition mapping relationship may be referred to the foregoing description and thus is not repeated herein.

Optionally, receiving a target access request sent by the bridging device may comprise: the back-end module receiving a notification message sent by the bridging device and obtaining the target access request from a back-end read and write request queue based on the notification message.

In some examples, the back-end module may also poll to detect the back-end read and write request queue of the back-end module according to a second preset period, so as to obtain the target access request.

Optionally, a process of configuring the address mapping relationship comprises: the virtual machine issuing configuration information to the front-end module; the front-end module issuing the configuration message to the bridging device to cause the bridging device to apply for memory space of the host to the back-end module based on the configuration information and create the address mapping relationship based on the configuration information and the memory space.

Optionally, a process of configuring the virtual partition mapping relationship comprises: the back-end module sending physical disk information to the bridging device to cause the bridging device to perform virtualization partitioning of the storage device based on the physical disk information; the virtual machine issuing virtual disk configuration information to the front-end module; the front-end module issuing the virtual disk configuration information to the bridging device to cause the bridging device to configure a corresponding virtual disk for the virtual machine user based on the virtual disk configuration information and create the virtual partition mapping relationship.

S230, performing information interaction with the storage device based on the target access request.

In some embodiments, in the event that the initial access request is a read operation, performing information interaction with the storage device based on the target access request comprises: reading (S2311) corresponding first target data from the storage device based on the second physical address, and storing the first target data to a memory of the host based on the first physical address; and sending (S2312) the first target data to the virtual machine user based on a preset address routing table.

Specifically, S2311 and S2312 may be performed by, without limitation to, the back-end module in the host.

In other embodiments, in the event that the initial access request is a write operation, performing information action with the storage device based on the target access request comprises: S2321, reading corresponding second target data from a memory of the host based on the first physical address; and S2322, writing the second target data to the storage device based on the second physical address.

Specifically, S2321 and S2322 may be performed by, without limitation to, the back-end module in the host.

Optionally, the method further comprises: the front-end module polling to detect a front-end read and write completion queue according to preset periods; and in the event of obtaining a completion message corresponding to the target access request from the front-end read and write completion queue, the front-end module sending the completion message to the corresponding virtual machine user, wherein the completion message in the front-end read and write completion queue corresponds to the initial access request; the virtual machine user performs a related operation based on the completion message.

In the embodiments of the present disclosure, in the event that at least one virtual machine is deployed on the host and the physical disk in the storage device is virtualized-partitioned to virtual disks, the initial access request of the virtual machine user to the virtual disk can be sent to the bridging device, so that the bridging device converts the initial access request to the virtual disk sent by the virtual machine user to a target access request; the target access request sent by the bridging device can be received, and information interaction can be performed with the storage device based on the target access request. Compared with the prior art, the technical solution disclosed herein can realize the sharing of the physical disk among a plurality of virtual machine users and thus improves the waste of resources.

The embodiments of the present disclosure further provide an electronic device, comprising: a memory storing a computer program thereon; a processor for executing the computer program, wherein the computer program, when executed by the processor, may implement the method of virtualization processing of a storage device as described any of the foregoing embodiments.

In some embodiments, the electronic device is a bridging device, at which point, the computer program, when executed by the processor, may implement a method of virtualization processing of a storage device where the bridging device is the execution body.

Optionally, for the bridging device, the processor may be, without limitation to, a system on chip (SoC) or a field programmable gate array (FPGA).

It may be understood that as FPGAs are cost-saving, when the memory is an FPGA, the cost of the bridging device can be saved.

In other embodiments, the electronic device is a host. The computer program, when executed by the processor, may implement a method of virtualization processing of a storage device where the host is the execution body.

Figure 5:
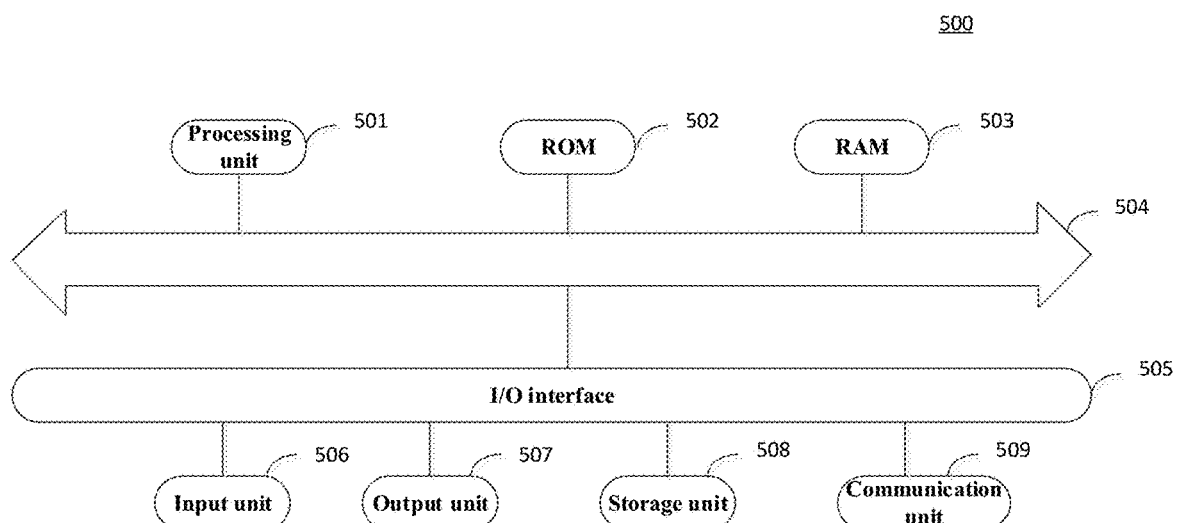
FIG. 5 shows a structural schematic diagram of an electronic device provided by the embodiments of the present application.

As an example, FIG. 5 is a structural schematic diagram of an electronic device in the embodiments of the present disclosure. With reference to FIG. 5 below, this figure shows a structural schematic diagram of an electronic device 500 which is applicable to implement the embodiments of the present disclosure. The electronic device 500 in the embodiments of the present disclosure may include, without limitation to, a mobile terminal such as a mobile phone, a notebook computer, a digital broadcast receiver, a PDA (personal digital assistant), a PAD (portable Android device), a PMP (portable multimedia player), an on-board terminal (e.g., an on-board navigation terminal), a wearable terminal device and the like, and a fixed terminal such as digital TV, a desktop computer, a smart home device and the like. The electronic device shown in FIG. 5 is merely an example and should not be construed as bringing any restriction on the functionality and usage scope of the embodiments of the present disclosure.

As shown in FIG. 5, the electronic device 500 may comprise a processing unit (e.g., a central processor, a graphics processor) 501 which is capable of performing various appropriate actions and processes to realize the method of table processing as described in the embodiments of the present disclosure in accordance with programs stored in a read only memory (ROM) 502 or programs loaded from a storage unit 508 to a random access memory (RAM) 503. In the RAM 503, there are also stored various programs and data required by the electronic device 500 when operating. The processing unit 501, the ROM 502 and the RAM 503 are connected to one another via a bus 504. An input/output (I/O) interface 505 is also connected to the bus 504.

Usually, the following units may be connected to the I/O interface 505: an input unit 806 including a touch screen, a touch pad, a keyboard, a mouse, a camera, a microphone, an accelerometers, a gyroscope, or the like; an output unit 507, such as a liquid-crystal display (LCD), a loudspeaker, a vibrator, or the like; a storage unit 508, such as a a magnetic tape, a hard disk or the like; and a communication unit 509. The communication unit 509 allows the electronic device to perform wireless or wired communication with other device so as to exchange data with other device. While FIG. 5 shows the electronic device 500 with various units, it should be understood that it is not required to implement or have all of the illustrated units. Alternatively, more or less units may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 509, or installed from the storage unit 508, or installed from the ROM 502. The computer program, when executed by the processing unit 501, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or will be developed in future, such as the hyper text transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device; and it may also exist alone without being assembled into the electronic device.

The computer readable medium carries one or more programs. The one or more programs, when executed by the electronic device that is a bridging device, cause the bridging device to: receive an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device; translate a virtual address corresponding to the virtual machine to a first physical address corresponding to a host based on a preconfigured address mapping relationship; translate the virtual access address to a second physical address corresponding to the storage device based on a preconfigured virtual partition mapping relationship; and generate a target access request based on the first physical address and the second physical address, and sending the target access request to the host, so as to cause the host to perform information interaction with the storage device based on the target access request.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware, wherein the name of a unit does not form any limitation to the unit per se in some case.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The embodiments of the present disclosure further provide a system of virtualization processing of a storage device, comprising: a bridging device as described in the foregoing embodiments, a host as described in the foregoing embodiments and a storage device, wherein the bridging device is connected with the host, at least one virtual machine is deployed on the host, and the virtual machine user performs information interaction with the host-mounted storage device through the bridging device.

To illustrate the system of virtualization processing of a storage device in detail, illustration is presented below based on a specific example.

Figure 6:
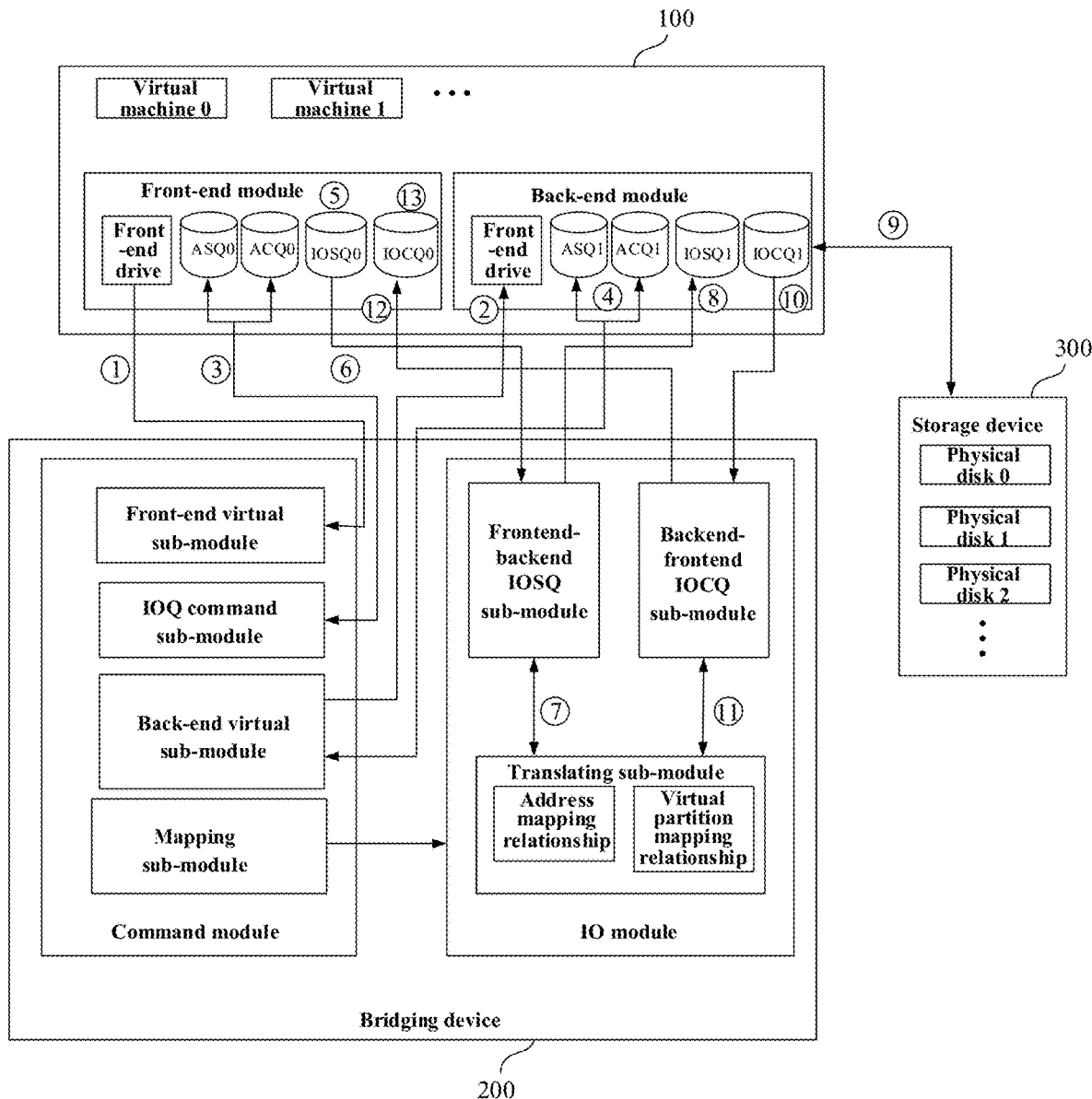
FIG. 6 shows a schematic diagram of a further system of virtualization processing of a storage device provided by the embodiments of the present disclosure.

As an example, FIG. 6 is a schematic diagram of a further system of virtualization processing of a storage device provided by the embodiments of the present disclosure. With reference to FIG. 6, the system of virtualization processing of a storage device comprises the host 100, the bridging device 200 and the storage device 300. At least one virtual machine is deployed on the host 100. The host 100 comprises a front-end module and a back-end module, the front-end module comprising a front-end drive, a front-end command queue (i.e., ASQ0), a front-end command completion queue (i.e., ACQ0), a front-end read and write request queue (i.e., IOSQ0) and a front-end read and write completion queue (i.e., IOCQ0), the back-end module comprising a back-end command queue (i.e., ASQ1), a back-end command completion queue (i.e., ACQ1), a back-end read and write request queue (i.e., IOSQ1) and a back-end read and write completion queue (i.e., IOCQ1). The bridging device 200 comprises a command module and an IO module, the command module comprising a front-end virtual sub-module, an IOQ command sub-module, a back-end virtual sub-module and a mapping sub-module, the IO module comprising a frontend-backend IOSQ sub-module, a back-end-frontend IOSQ sub-module and a translating sub-module, the translating sub-module comprising an address mapping relationship and a virtual partition mapping relationship. The storage device 300 comprises at least one physical disk. The front-end module is connected with the virtual machine, the back-end module is connected with the storage device, and the bridging device is connected with the front-end module and the back-end module respectively.

Still with reference to FIG. 6, a process of the virtual machine user configuring the host 100—mounted storage device through the bridging device is as below:

1. The front-end drive issues configuration information to the front-end virtual sub-module.

For example, the front-end drive initializes the front-end virtual sub-module and issues the configuration pci config space, pcie Bar, pcie cap (sriov/nvme . . . ) to the front-end virtual sub-module.

2. The back-end virtual sub-module applies for memory space of the host to the back-end module based on the configuration information and obtains physical disk information on the storage device through the back-end module.

For example, the back-end virtual sub-module is initialized, the Bar space of the back-end virtual sub-module is configured, the memory space of the host is applied for, the physical disk information on the storage device is obtained, and so on.

3. The IOQ command sub-module takes over an administration queue (i.e., admin Queue). For example, the administration queue may comprise administration requests such as create a queue/delete a queue, etc.

4. The mapping sub-module creates the address mapping relationship based on the configuration information and the memory space, performs virtualization partitioning of the storage device based on the physical disk information, configures a corresponding virtual disk for the virtual machine user based on the virtual disk configuration information and creates the virtual partition mapping relationship. Of course, the bridging device may also pass a command request (i.e., Admin SQE) to the back-end virtual sub-module, and the back-end virtual sub-module may also forward the returned command completion notification (i.e., Admin CQE) to the front-end module.

In some examples, the bridging device may further manage a queue state, delete the creation of namespace and save the SQ/CQ base address, Qos pbs/cbs/pir/cir and the like of the front-end module/back-end module.

Still with reference to FIG. 6, a process of the virtual machine user performing information interaction with a storage device mounted on the host 100 through the bridging device may be as below:

5. The virtual machine user sends an initial access request to a virtual disk to the front-end read and write request queue (IOSQ0) of the front-end module.

The initial access request comprises: a virtual address corresponding to the virtual machine, and a virtual access address in the virtual disk, wherein the virtual disk is a virtual storage area allocated for the virtual machine user by the bridging device after virtualization partitioning of a physical disk in the storage device.

6. The frontend-backend IOSQ sub-module receives a doorbell message issued by the front-end module and obtains the initial access request to the virtual disk sent by the virtual machine user from the front-end read and write request queue (IOSQ0) based on the doorbell message.

7. The translating sub-module translates the virtual address corresponding to the virtual machine to a first physical address corresponding to the host based on a preconfigured address mapping relationship, translates the virtual access address to a second physical address corresponding to the storage device based on a preconfigured virtual partition mapping relationship, and generates a target access request based on the first physical address and the second physical address.

For example, the virtual address comprises a first data pointer (PRP1), a second data pointer (PRP2) and an address (iova) of a page list, and the virtual address is translated to the first physical address based on the address mapping relationship. Suppose iova [63:0]={iova_page_id[51:0], offset[11:0], hpa_page_id[51:0] can be obtained by querying the address mapping relationship with iova_page_id[51:0], and the obtained hpa [63:0]={hpa_page_id[51:0], offset[11:0]} is the first physical address.

The virtual access address comprises a logical address (LBA) and a name space identifier (NSID), and the virtual address is converted to the first physical address through the virtual partition mapping relationship.

8. The translating sub-module writes the target access request to the back-end read and write request queue (IOSQ1) of the back-end module through the frontend-backend IOSQ sub-module and sends a notification message to the back-end module.

9. The back-end module obtains the target access request from the back-end read and write request queue (IOSQ1) based on the notification message.

10. The backend-frontend IOSQ sub-module polls to detect the back-end read and write completion queue (IOCQ1) of the back-end module according to preset periods.

11. In the event of obtaining an initial completion message corresponding to the target access request from the back-end read and write completion queue (IOCQ1), the backend-frontend IOSQ sub-module sends the initial completion message to the translating sub-module to cause the translating sub-module to translate the initial completion message and obtain a completion message, wherein the completion message corresponds to the initial access request.

In some examples, the back-end module may, after completing the processing of the target access request, fill the initial completion message in the back-end read and write completion queue (IOCQ1) and issue a message to the backend-frontend IOSQ sub-module to cause the backend-frontend IOSQ sub-module to obtain the initial completion message from the back-end read and write completion queue (IOCQ1).

12. The frontend-backend IOSQ sub-modules sends the completion message to the front-end read and write completion queue (IOCQ0) of the front-end module and reports an interruption notification to the front-end module at the same time.

13. The front-end module, after receiving the interruption notification, updates a state of the completion message in the front-end read and write completion queue (IOCQ0).

The embodiments of the present disclosure further provide a computer readable storage medium storing a computer program thereon, wherein the computer program, when executed by a processor, may implement the method of any of the foregoing embodiments. The apparatus of table processing provided by the embodiments of the present disclosure can perform the steps of the method of table processing provided by the method embodiments of the present disclosure in a similar manner and with similar beneficial effects, which will not be repeated herein.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

We claim:

1. A method of virtualization processing of a storage device, comprising:
   receiving an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device;
   translating the virtual address corresponding to the virtual machine to a first physical address corresponding to a host based on a preconfigured address mapping relationship;
   translating the virtual access address to a second physical address corresponding to the storage device based on a preconfigured virtual partition mapping relationship; and
   generating a target access request based on the first physical address and the second physical address, and sending the target access request to the host, so as to cause the host to perform information interaction with the storage device based on the target access request.

2. The method of claim 1, wherein the host comprises a front-end module and a back-end module, wherein the front-end module is connected with the virtual machine, the back-end module is connected with the storage device, the bridging device is connected with the front-end module and the back-end module respectively, and a process of configuring the address mapping relationship comprises:
   receiving configuration information issued by the virtual machine through the front-end module;
   applying for a memory space of the host to the back-end module based on the configuration information; and
   creating the address mapping relationship based on the configuration information and the memory space.

3. The method of claim 2, wherein a process of configuring the virtual partition mapping relationship comprises:
   obtaining physical disk information on the storage device through the back-end module;
   receiving virtual disk configuration information issued by the virtual machine through the front-end module;
   performing virtualization partitioning on the storage device based on the physical disk information; and
   configuring a corresponding virtual disk for the virtual machine user based on the virtual disk configuration information, and creating the virtual partition mapping relationship.

4. The method of claim 2, wherein receiving the initial access request to a virtual disk sent by the virtual machine user comprises:
   receiving a doorbell message issued by the front-end module; and
   based on the doorbell message, obtaining the initial access request to a virtual disk sent by the virtual machine user from a front-end read and write request queue of the front-end module based on the doorbell message.

5. The method of claim 2, wherein sending the target access request to the host comprises:
sending the target access request to a back-end read and write request queue of the back-end module; and
sending a notification message to the back-end module to cause the back-end module to obtain the target access request from the back-end read and write request queue based on the notification message.

6. The method of claim 2, further comprising:
polling to detect a back-end read and write completion queue of the back-end module according to preset periods; and
in the event of obtaining a completion message corresponding to the target access request from the back-end read and write completion queue, sending the completion message to a front-end read and write completion queue of the front-end module, wherein
a completion message in the front-end read and write completion queue corresponds to the initial access request, so as to cause the virtual machine user to perform a related operation based on the completion message.

7. A method of virtualization processing of a storage device, comprising:
sending, to a bridging device, an initial access request to a virtual disk of a virtual machine user, wherein the initial access request comprises: a virtual address corresponding to the virtual machine, and a virtual access address in the virtual disk, wherein the virtual disk is a virtual storage area allocated for the virtual machine user by the bridging device after virtualization partitioning of a physical disk in the storage device;
receiving a target access request sent by the bridging device, the target access request comprising a first physical address and a second physical address, wherein the first physical address is an address corresponding to a host as translated from the virtual address corresponding to the virtual machine by the bridging device based on a preconfigured address mapping relationship, and the second physical address is an address corresponding to the storage device as translated from the virtual access address by the bridging device based on a preconfigured virtual partition mapping relationship; and
performing information interaction with the storage device based on the target access request.

8. The method of claim 7, wherein in the event that the initial access request is a read operation, performing information interaction with the storage device based on the target access request comprises:
reading corresponding first target data from the storage device based on the second physical address, and storing the first target data to a memory of the host based on the first physical address; and
sending the first target data to the virtual machine user based on a preset address routing table.

9. The method of claim 7, wherein in the event that the initial access request is a write operation, performing information interaction with the storage device based on the target access request comprises:
reading corresponding second target data from a memory of the host based on the first physical address; and
writing the second target data to the storage device based on the second physical address.

10. A bridging device, comprising:
a processor; and
a memory for storing instructions executable by the processor;
the processor being for reading the executable instructions from the memory and executing the instructions to:
receive an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device;
translate a virtual address corresponding to the virtual machine to a first physical address corresponding to a host based on a preconfigured address mapping relationship;
translate the virtual access address to a second physical address corresponding to the storage device based on a preconfigured virtual partition mapping relationship; and
generate a target access request based on the first physical address and the second physical address, and sending the target access request to the host, so as to cause the host to perform information interaction with the storage device based on the target access request.

11. The bridging device of claim 10, wherein the host comprises a front-end module and a back-end module, wherein the front-end module is connected with the virtual machine, the back-end module is connected with the storage device, the bridging device is connected with the front-end module and the back-end module respectively, and a process of configuring the address mapping relationship comprises:
receiving configuration information issued by the virtual machine through the front-end module;
applying for a memory space of the host to the back-end module based on the configuration information; and
creating the address mapping relationship based on the configuration information and the memory space.

12. The bridging device of claim 11, wherein a process of configuring the virtual partition mapping relationship comprises:
obtaining physical disk information on the storage device through the back-end module;
receiving virtual disk configuration information issued by the virtual machine through the front-end module;
performing virtualization partitioning on the storage device based on the physical disk information; and
configuring a corresponding virtual disk for the virtual machine user based on the virtual disk configuration information, and creating the virtual partition mapping relationship.

13. The bridging device of claim 11, wherein receiving an initial access request to a virtual disk sent by the virtual machine user comprises:
receiving a doorbell message issued by the front-end module; and
obtaining an initial access request to a virtual disk sent by the virtual machine user from a front-end read and write request queue of the front-end module based on the doorbell message.

14. The bridging device of claim 11, wherein sending the target access request to the host comprises:
sending the target access request to a back-end read and write request queue of the back-end module; and sending a notification message to the back-end module to cause the back-end module to obtain the target access request from the back-end read and write request queue based on the notification message.

15. The bridging device of claim 11, wherein the processor further executes the instructions to:
poll to detect a back-end read and write completion queue of the back-end module according to preset periods; and
in the event of obtaining a completion message corresponding to the target access request from the back-end read and write completion queue, send the completion message to a front-end read and write completion queue of the front-end module, wherein
a completion message in the front-end read and write completion queue corresponds to the initial access request, so as to cause the virtual machine user to perform a related operation based on the completion message.

16. The bridging device of claim 10, wherein the processor is a system on chip (SoC) or a field programmable gate array (FPGA).

17. A non-transitory computer readable storage medium storing a computer program thereon, wherein the computer program, when executed by the processor, causes the processor to:
receive an initial access request to a virtual disk sent by a virtual machine user, wherein the initial access request comprises: a virtual address corresponding to the virtual machine, and a virtual access address in the virtual disk, wherein the virtual disk is a virtual storage area allocated for the virtual machine user by a bridging device after virtualization partitioning of a physical disk in the storage device;
translate a virtual address corresponding to the virtual machine to a first physical address corresponding to a host based on a preconfigured address mapping relationship;
translate the virtual access address to a second physical address corresponding to the storage device based on a preconfigured virtual partition mapping relationship; and
generate a target access request based on the first physical address and the second physical address, and sending the target access request to the host, so as to cause the host to perform information interaction with the storage device based on the target access request.

18. The non-transitory computer readable storage medium of claim 17, wherein the host comprises a front-end module and a back-end module, wherein the front-end module is connected with the virtual machine, the back-end module is connected with the storage device, the bridging device is connected with the front-end module and the back-end module respectively, and a process of configuring the address mapping relationship comprises:
receiving configuration information issued by the virtual machine through the front-end module;
applying for a memory space of the host to the back-end module based on the configuration information; and
creating the address mapping relationship based on the configuration information and the memory space.

19. The non-transitory computer readable storage medium of claim 18, wherein a process of configuring the virtual partition mapping relationship comprises:
obtaining physical disk information on the storage device through the back-end module;
receiving virtual disk configuration information issued by the virtual machine through the front-end module;
performing virtualization partitioning on the storage device based on the physical disk information; and
configuring a corresponding virtual disk for the virtual machine user based on the virtual disk configuration information, and creating the virtual partition mapping relationship.

20. The non-transitory computer readable storage medium of claim 18, wherein receiving an initial access request to a virtual disk sent by the virtual machine user comprises:
receiving a doorbell message issued by the front-end module; and
obtaining an initial access request to a virtual disk sent by the virtual machine user from a front-end read and write request queue of the front-end module based on the doorbell message.

* * * * *